US006871961B2

United States Patent
Balu et al.

(10) Patent No.: US 6,871,961 B2
(45) Date of Patent: Mar. 29, 2005

(54) SYSTEMS AND METHODS FOR TILING MULTIPLE PROJECTORS TO FORM AN IMAGE

(75) Inventors: Suresh Balu, Chapel Hill, NC (US); D'nardo Colucci, Minneapolis, MN (US); Raymond L. Idaszak, Apex, NC (US); Eric Knisley, Durham, NC (US)

(73) Assignee: Elumens Corporation, Durham, NC (US)

( * ) Notice: Subject to any disclaimer, the term of this patent is extended or adjusted under 35 U.S.C. 154(b) by 301 days.

(21) Appl. No.: 10/247,592

(22) Filed: Sep. 19, 2002

(65) Prior Publication Data

US 2003/0117588 A1 Jun. 26, 2003

Related U.S. Application Data

(60) Provisional application No. 60/323,690, filed on Sep. 20, 2001.

(51) Int. Cl.[7] ........................... G03B 21/14; G02F 1/133
(52) U.S. Cl. ............................. 353/94; 353/122; 349/8; 352/70
(58) Field of Search ................................ 353/7, 30, 94, 353/122; 349/8; 352/69–71; 438/257, 276–278

(56) References Cited

U.S. PATENT DOCUMENTS

| 3,768,899 A | 10/1973 | De La Parra ................. 353/82 |
| 5,394,204 A | 2/1995 | Shigeta et al. ................ 353/31 |
| 5,555,035 A | 9/1996 | Mead et al. ................. 348/757 |
| 5,632,545 A | 5/1997 | Kikinis ......................... 353/31 |
| 5,762,413 A | 6/1998 | Colucci et al. ............. 353/122 |
| 6,231,189 B1 * | 5/2001 | Colucci et al. ............... 353/20 |

OTHER PUBLICATIONS

International Search Report for PCT/US02/30029, May 13, 2003.

* cited by examiner

*Primary Examiner*—Russell Adams
*Assistant Examiner*—Michael Dalakis
(74) *Attorney, Agent, or Firm*—Myers Bigel Sibley & Sajovec, P.A.

(57) ABSTRACT

An optical projection system includes a first optical image projector that is configured to generate a first array of image pixels having a first pupil associated therewith. A second optical image projector is configured to generate a second array of image pixels having a second pupil associated therewith. An optical element is configured to superimpose the first and second pupils to create a single exit pupil.

37 Claims, 4 Drawing Sheets

SYSTEMS AND METHODS FOR TILING MULTIPLE PROJECTORS TO FORM AN IMAGE

CROSS-REFERENCE TO PROVISIONAL APPLICATION

This application claims the benefit of Provisional Application No. 60/323,690, filed Sep. 20, 2001, entitled "Systems and Methods for Tiling Multiple Projectors to Form an Image," the disclosure of which is hereby incorporated herein by reference.

BACKGROUND OF THE INVENTION

The present invention relates to optical projection systems and methods, and, more particularly, to hemispherical optical projection systems and methods.

High-resolution hemispherical projection systems often use multiple projectors placed around a display surface. These systems, however, may require significant alignment and upkeep, including edge blending and color matching. For example, these "tiled" images may be blended at the edges to create a single continuous image. Edge blending techniques have generally evolved so that the resulting high-resolution image is acceptable. Rear projection systems may be expensive and may require a room that is on average twice as big as the display surface. In front projection systems, the projectors may need to be individually mounted and, again, may require a relatively large volume room. Once the projectors are individually positioned, the task of aligning them to allow for edge blending may be relatively tedious. This alignment procedure may need to be repeated at regular intervals based on such factors as changes in temperature, humidity, and vibration, and/or whenever the system is moved.

SUMMARY OF THE INVENTION

According to some embodiments of the present invention, an optical projection system comprises a first optical image projector that is configured to generate a first array of image pixels having a first pupil associated therewith. A second optical image projector is configured to generate a second array of image pixels having a second pupil associated therewith. An optical element is configured to superimpose the first and second pupils to create a single exit pupil. Advantageously, by superimposing the pupils of each projector to create a single exit pupil, design constraints on a final projection lens may be eased.

In other embodiments, the first and second optical image projectors are configured to respectively project the first and second arrays of image pixels through the optical element and onto a surface such that there is constant angular separation between adjacent pixels. The surface may be a non-planar surface, such as, for example, a hemispherical surface. Moreover, the optical projectors may project the arrays of image pixels through the optical element and onto surfaces, such as hemispherical surfaces, of varying radii.

In various embodiments of the present invention, the optical projectors may respectively comprise a digital light processing (DLP) unit, a liquid crystal display (LCD) unit, and/or a liquid crystal on silicon (LCOS) unit.

In further embodiments of the present invention, an image deviation system is configured to direct the first and second arrays of image pixels into respective adjacent regions of an image plane. The image deviation system may comprise, for example, a plurality of mirrors and/or at least one prism that is arranged to direct the first and second arrays of image pixels into the adjacent regions of the image plane.

In still further embodiments of the present invention, intermediate image lenses are positioned between the optical image projectors and the image deviation system and are configured to generate intermediate first and second images in the respective adjacent regions responsive to the first and second arrays of image pixels. The intermediate first and second images having intermediate first and second pupils associated therewith, respectively. The optical element is configured to superimpose the intermediate first and second pupils so as to create the exit pupil.

In other embodiments of the present invention, the optical element may comprise a refractive lens, a diffractive lens, and/or a microlens array. An exit lens may be configured to project an exit image, which is associated with the exit pupil, onto a surface.

Although described primarily above with respect to system and/or apparatus embodiments of the present invention, it should be understood that the present invention may be embodied as methods of optical projection.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF PREFERRED EMBODIMENTS

Figure 1A:
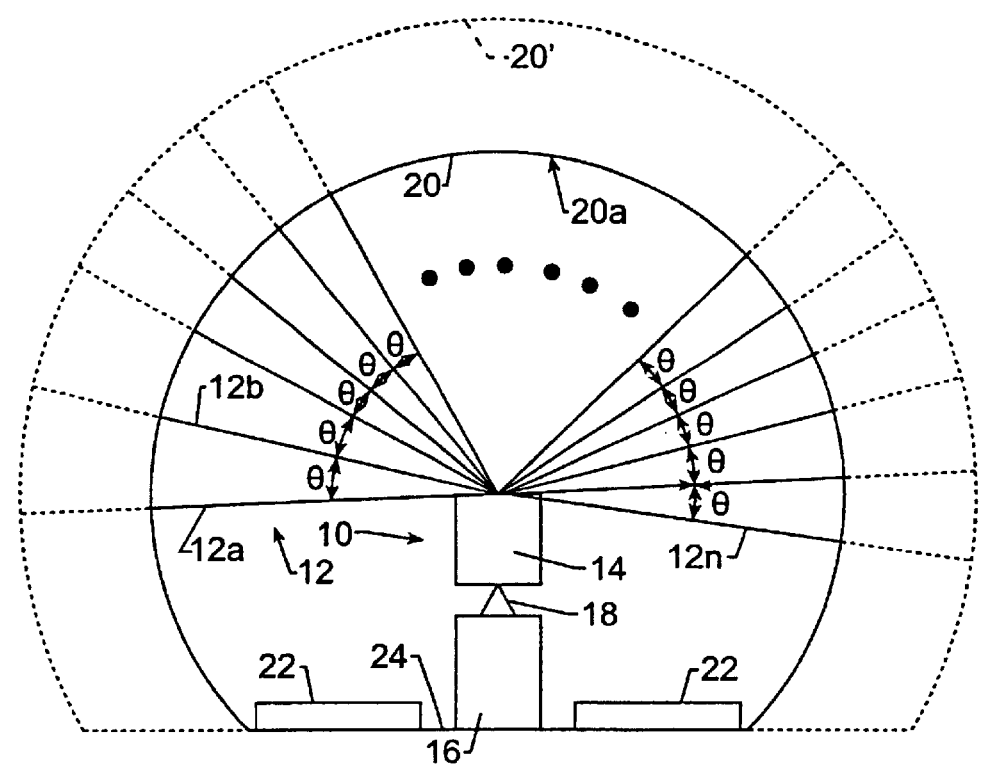
FIGS. 1A and 1B are block diagrams that illustrate optical image projectors and methods that may be used in optical projection systems and methods for tiling multiple projectors to form an image in accordance with some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

Figure 1B:
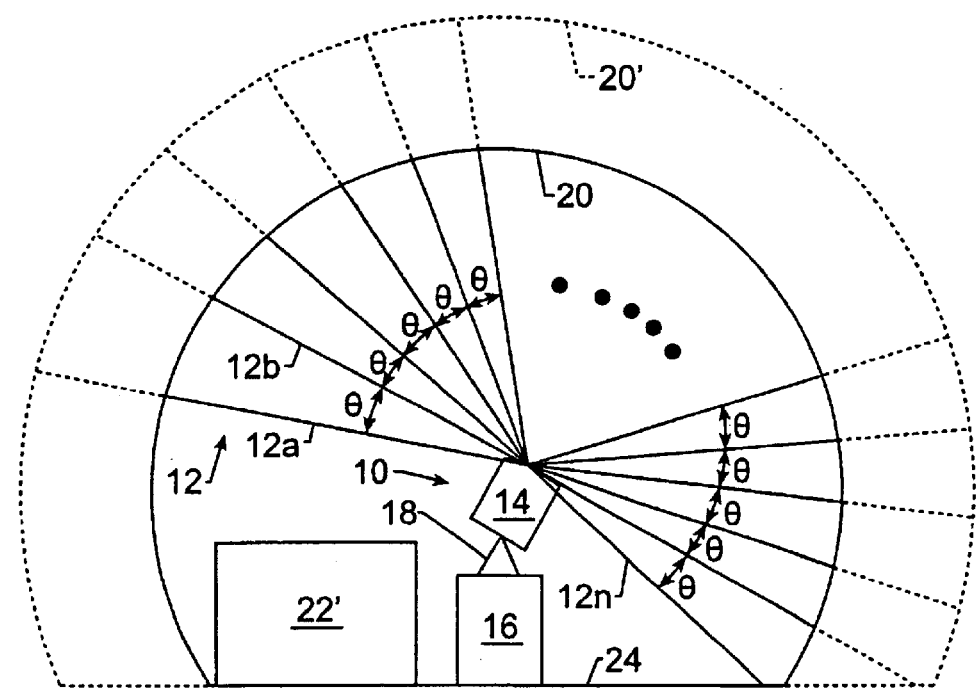

Referring now to FIGS. 1A and 1B, a tiltable optical image projector having constant angular separation of projected pixels, according to some embodiments of the present invention, will now be described. An optical image projector 10 projects an array of image pixels 12 having constant angular separation among adjacent pixels as indicated by the angle θ, which is constant among adjacent pixels 12a–12n. The constant angular separation among adjacent pixels may be provided as described, for example, in U.S. Pat. No. 5,762,413 (hereinafter "'413 patent"), entitled "Tiltable Hemispherical Optical Projection Systems and Methods Having Constant Angular Separation of Projected Pixels" and assigned to the assignee of the present application, the disclosure of which is hereby incorporated herein by reference. As shown in FIGS. 1A and 1B, the optical image projector 10 projects the array of image pixels 12 having constant angular separation onto the inner surface 20a of a truncated hemispherical dome 20. The optical image projector 10 may be referred to as having an F-θ inverse telephoto lens, where f is the focal length of the lens and θ is the angle of projection. Although embodiments of the present invention are illustrated herein in the context of projecting image pixels onto a hemispherical surface, it will be understood that any screen surface may be used, including, but not limited to, hyper-hemispherical surfaces and elliptical surfaces.

By maintaining constant angular separation among adjacent pixels, a low distortion image may be projected by the optical image projector 10 onto domes of varying radii, which is illustrated by surface 20'. Domes of radii from 4 to 8 meters may be accommodated in accordance with some embodiments of the present invention. To maintain low distortion with constant angle of separation, the optical image projector 10 may be mounted at the center of the inner dome surface 20a so as to radially project the array of image pixels 12 onto the inner dome surface.

Still referring to FIGS. 1A and 1B, some embodiments of the optical image projector 10 also comprise means for tilting or aiming the array of image pixels 12 so that the optical image projector 10 projects the array of pixels onto a plurality of selectable positions on the inner dome surface 20a. For example, as shown in FIGS. 1A and 1B, the projecting optics 14 may be pivotally mounted on a base 16 using a pivot 18. The base 16 is located on the floor 24 of the dome 20. The pivot 18 may allow pivoting within a plane or in multiple planes. The design of the pivot 18 is generally known to those skilled in the art and need not be described further herein.

By incorporating tilting or aiming means, the optical image projector 10 may project vertically upward in a planetarium projection as shown in FIG. 1A or may project at an angle (for example 45 degrees) from vertical in a theater projection position, as shown in FIG. 1B. Typically, when projecting in a planetarium style as shown in FIG. 1A, the audience area 22 surrounds the projection system 10. In contrast, when projecting theater style, the audience area 22' is typically behind the optical image projector 10 and the audience area 22' is raised so that the audience can see the entire field of view in front of them. Thus, different audience configurations may be accommodated.

The dome 20 may be constructed for portability and ease of assembly and disassembly. Exemplary embodiments of the dome 20 are described in U.S. Pat. No. 5,724,775, entitled "Multi-Pieced, Portable Projection Dome and Method of Assembling the Same" and assigned to the assignee of the present application, the disclosure of which is hereby incorporated herein by reference.

Figure 2:
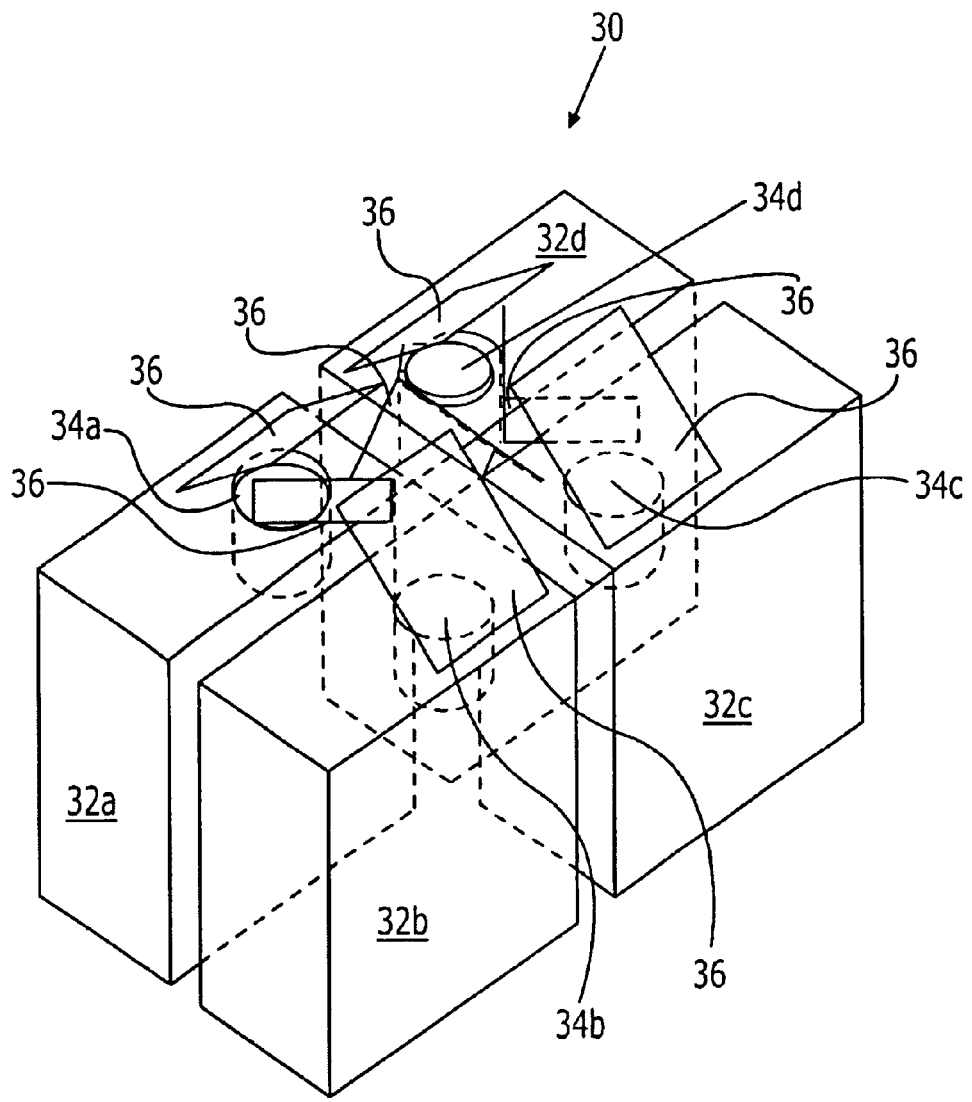
FIG. 2 is a schematic diagram that illustrates an optical projection system comprising optical image projectors, intermediate lenses, and an image deviation system that may be used in optical projection systems and methods for tiling multiple projectors to form an image in accordance with some embodiments of the present invention.

Referring now to FIG. 2, an optical projection system 30, in accordance with some embodiments of the present invention, will now be described. The optical projection system 30 comprises four optical image projectors 32a, 32b, 32c, and 32d. In accordance with various embodiments of the present invention, each of these optical image projectors 32a, 32b, 32c, and 32d may be embodied as an optical image projector having constant angular separation between adjacent pixels as described above with respect to optical image projector 10 (see FIGS. 1A and 1B) or as a conventional VGA, SVGA, XGA, SXGA, or UXGA image projector. The image sources used in the optical image projectors 32a, 32b, 32c, and 32d may comprise a digital light processing (DLP) unit, a liquid crystal display (LCD) unit, and/or a liquid crystal on silicon (LCOS) unit. The arrays of image pixels generated by the optical image projectors 32a, 32b, 32c, and 32d may be formed by a single light path for projecting gray scale images, a single light path for projecting color images, or by combining separate red, green, and blue light paths as described in the above-incorporated '413 patent.

Figure 3:
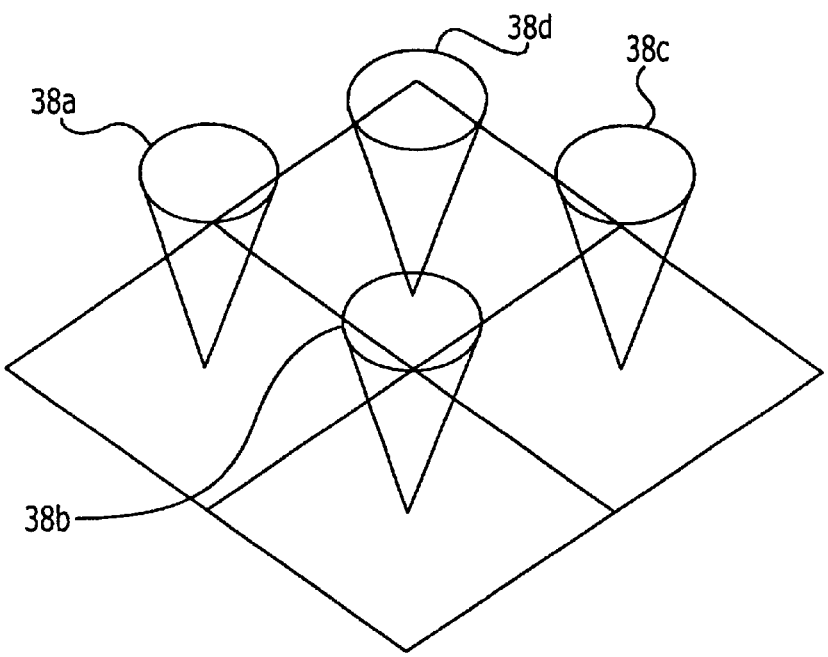
FIG. 3 is a diagram that illustrates the intermediate image plane of the optical projection system of FIG. 2 in accordance with some embodiments of the present invention.

In accordance with some embodiments of the present invention, a plurality of intermediate image lenses 34a, 34b, 34c, and 34d are configured to generate four respective intermediate images 38a, 38b, 38c, and 38d in an intermediate image plane as shown in FIG. 3. An image deviation system 36 comprising a plurality of mirrors is configured to direct the four respective intermediate images 38a, 38b, 38c, and 38d into an intermediate image plane comprising four quadrants, one for each optical image projector 32a, 32b, 32c, and 32d. It will be understood that although the image deviation system 36 is illustrated in FIG. 2 as comprising a plurality of mirrors, the image deviation system may also be embodied with additional and/or other types of optical devices for directing light, such as, for example, prisms.

As shown in FIG. 3, pupils associated with images from a plurality of optical image projectors may be combined or tiled in such a manner as to create a single image that has twice the linear resolution in each dimension. Unfortunately, the intermediate pupils 38a, 38b, 38c, and 38d may be physically separated by the distance between the centers of each quadrant. This may effectively increase the required focal ratio of the projection lens. For example, assume the individual image array is generated by a 0.7" DLP projector with an exit pupil at infinity and an aperture ratio of F/3.0. Further assume that the reimaging lens has a focal length of 100 mm and is used at unit magnification. In this scenario, the final projection lens may need to be F/1.55 to collect all of the light from four projectors. This may increase the lens diameter and may make it significantly more costly. Moreover, in the case of very wide-angle projection, it may reduce or prevent acceptable lens performance.

Figure 4:
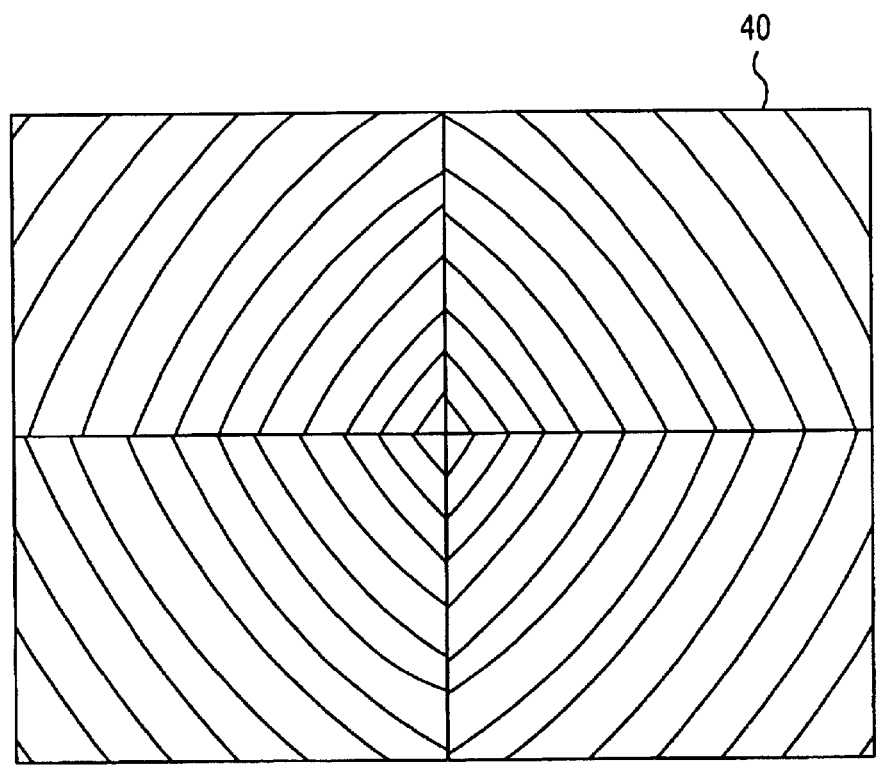
FIGS. 4 and 5 are diagrams of an optical element that may be used in optical projection systems and methods for tiling multiple projectors to form an image in accordance with some embodiments of the present invention.
Figure 5:
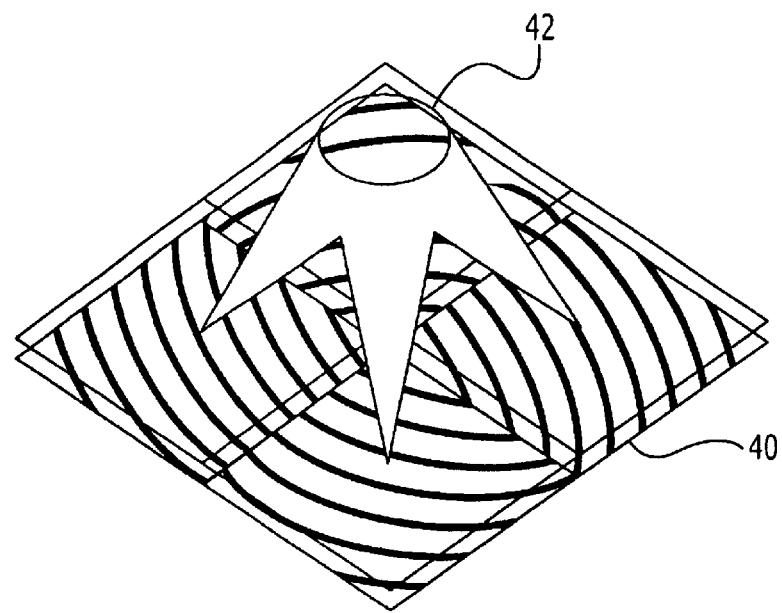

In accordance with some embodiments of the present invention illustrated in FIG. 4, an optical element 40 may be placed near the intermediate image plane and may effectively function as four different lenses—one for each quadrant. The optical element 40 may be embodied as a refractive lens, a diffractive lens, a microlens array, and/or combinations thereof. As shown in FIG. 5, the optical element 40 may be configured to superimpose the intermediate pupils 38a, 38b, 38c, and 38d in the respective quadrants so as to create a single exit pupil 42. By superimposing the intermediate pupils 38a, 38b, 38c, and 38d onto a single exit pupil 42, the final projection lens may have the same F/# as the individual optical image projectors 32a, 32b, 32c, and 32d. This may allow the final projection lens to be relatively small while still capturing the light from the arrays of image pixels generated by the optical image projectors 32a, 32b, 32c, and 32d.

Figure 6:
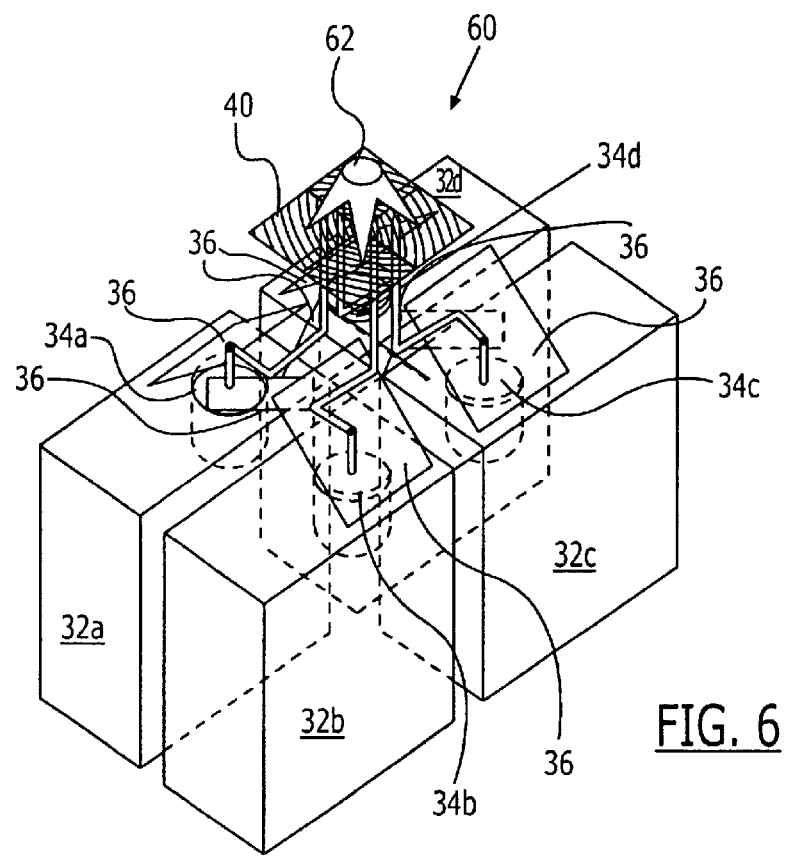
FIG. 6 is a diagram of an optical projection systems and methods for tiling multiple projectors to form an image in accordance with some embodiments of the present invention.

Referring now to FIG. 6, an optical projection system 60, in accordance with some embodiments of the present invention, comprises the optical projection system 30 of FIG. 2, the optical element 40 of FIGS. 3 and 4, and an exit or final projection lens 62. By tiling multiple projectors before the single exit lens 62, the optical projection system 62 may be more compact and more robust than multiple independent edge-blended optical image projectors. Furthermore, the multiple projector system may be less costly than a single projector with equal resolution and brightness and can exceed the resolution of conventional stand-alone optical image projectors.

It will be understood that although optical projection system embodiments have been described herein with respect to tiling four optical image projectors, the present invention is not limited to such a configuration. In general, the present invention may be embodied using an optical element to superimpose the pupils of two or more optical image projectors to generate a single exit pupil.

Many variations and modifications can be made to the preferred embodiments without substantially departing from the principles of the present invention. All such variations and modifications are intended to be included herein within the scope of the present invention, as set forth in the following claims. It will be understood that the scope of the present invention is not limited by the claims, but is intended to encompass the present disclosure, including structural and functional equivalents thereof.

We claim:

1. An optical projection system, comprising:
   first, second, third, and fourth image projectors that are configured to generate first, second, third, and fourth arrays of image pixels having first, second, third, and fourth pupils associated therewith, respectively;
   first, second, third, and fourth intermediate image lenses that are configured to generate first, second, third, and fourth intermediate images responsive to the first, second, third, and fourth arrays of image pixels, respectively;
   an image deviation system that is configured to direct the first, second, third, and fourth intermediate images into respective adjacent quadrants of an image plane, the directed first, second, third, and fourth intermediate images having first, second, third, and fourth intermediate pupils associated therewith, respectively; and
   an optical element that is configured to superimpose the first, second, third, and fourth intermediate pupils to create an exit pupil.

2. The optical projection system of claim 1, wherein the image deviation system comprises a plurality of mirrors that are arranged to direct the first, second, third, and fourth intermediate images into the adjacent quadrants of the image plane.

3. The optical projection system of claim 1, wherein the image deviation system comprises at least one prism that is arranged to direct the first, second, third, and fourth intermediate images into the adjacent quadrants of the image plane.

4. The optical projection system of claim 1, wherein the optical element comprises a refractive lens.

5. The optical projection system of claim 1, wherein the optical element comprises a diffractive lens.

6. The optical projection system of claim 1, wherein the optical element comprises a microlens array.

7. The optical projection system of claim 1, further comprising:
   an exit lens that is configured to project an exit image associated with the exit pupil onto a surface.

8. A method of projecting an image, comprising:
   projecting first, second, third, and fourth arrays of image pixels having first, second, third, and fourth pupils associated therewith, respectively;
   generating first, second, third, and fourth intermediate images responsive to the first, second, third, and fourth arrays of image pixels, respectively;
   directing the first, second, third, and fourth intermediate images into adjacent quadrants of an image plane, the directed first, second, third, and fourth intermediate images having first, second, third, and fourth intermediate pupils associated therewith, respectively; and
   superimposing the first, second, third, and fourth intermediate pupils to create an exit pupil.

9. The method of claim 8, further comprising:
   projecting an exit image associated with the exit pupil onto a surface such that there is constant angular separation between pixels of the exit image.

10. A system for projecting an image, comprising:
    mans for projecting first, second, third, and fourth arrays of image pixels having first, second, third, and fourth pupils associated therewith, respectively;
    means for generating first, second, third, and fourth intermediate images responsive to the first, second, third, and fourth arrays of image pixels, respectively;
    means for directing the first, second, third, and fourth intermediate images into adjacent quadrants of an image plane, the directed first, second, third, and fourth intermediate images having first, second, third, and fourth intermediate pupils associated therewith, respectively; and
    means for superimposing the first, second, third, and fourth intermediate pupils to create an exit pupil.

11. The system of claim 10, further comprising:
    means for projecting an exit image associated with the exit pupil onto a surface such that there is constant angular separation between pixels of the exit image.

12. An optical projection system, comprising:
    a first optical image projector that is configured to generate a first array of image pixels having a first pupil associated therewith;
    a second optical image projector that is configured to generate a second array of image pixels having a second pupil associated therewith; and
    an optical element that is configured to superimpose the first and second pupils to create an exit pupil.

13. The optical projection system of claim 12, wherein the first and second optical image projectors are configured to respectively project the first and second arrays of image pixels through the optical element and onto a surface such that there is a constant angular separation between adjacent pixels.

14. The optical projection system of claim 13, wherein the surface is a non-planar surface.

15. The optical projection system of claim 14, wherein the surface is a hemispherical surface.

16. The optical projection system of claim 15, wherein the first and second optical image projectors are configured to respectively project the first and second arrays of image pixels through the optical element and onto hemispherical surfaces of varying radii.

17. The optical projection system of claim 12, wherein the first and second optical image projectors comprise respective units selected from the group of units consisting of a digital light processing unit, a liquid crystal display unit, and a liquid crystal on silicon unit.

18. The optical projection system of claim 12, further comprising:
an image deviation system that is configured to direct the first and second arrays of image pixels into respective adjacent regions of an image plane.

19. The optical projection system of claim 18, wherein the image deviation system comprises a plurality of mirrors that are arranged to direct the first and second arrays of image pixels into the adjacent regions of the image plane.

20. The optical projection system of claim 18, wherein the image deviation system comprises at least one prism that is arranged to direct the first and second arrays of image pixels into the adjacent regions of the image plane.

21. The optical projection system of claim 18, further comprising:
a first intermediate image lens that is positioned between the first optical image projector and the image deviation system and is configured to generate a first intermediate image in one of the adjacent regions of the image plane responsive to the first array of image pixels;
a second intermediate image lens that is positioned between the second optical image projector and the image deviation system and is configured to generate a second intermediate image in the other one of the adjacent regions of the image plane responsive to the second array of image pixels, the first and second intermediate images having first and second intermediate pupils associated therewith, respectively; and
wherein the optical element is configured to superimpose the first and second intermediate pupils to create the exit pupil.

22. The optical projection system of claim 12, wherein the optical element comprises a refractive lens.

23. The optical projection system of claim 12, wherein the optical element comprises a diffractive lens.

24. The optical projection system of claim 12, wherein the optical element comprises a microlens array.

25. The optical projection system of claim 12, further comprising:
an exit lens that is configured to project an exit image associated with the exit pupil onto a surface.

26. A method of projecting an image, comprising:
projecting a first array of image pixels having a first pupil associated therewith;
projecting a second array of image pixels having a second pupil associated therewith; and
superimposing the first and second pupils to create an exit pupil.

27. The method of claim 26, further comprising:
projecting an exit image associated with the exit pupil onto a surface such that there is constant angular separation between pixels of the exit image.

28. The method of claim 27, wherein the surface is a non-planar surface.

29. The method of claim 28, wherein the surface is a hemispherical surface.

30. The method of claim 26, further comprising:
directing the first and second arrays of image pixels into respective adjacent regions of an image plane.

31. The method of claim 30, further comprising:
generating first and second intermediate images in the respective adjacent regions of the image plane responsive to the first and second arrays of image pixels, the first and second intermediate images having first and second intermediate pupils associated therewith; and
wherein superimposing the first and second pupils comprises:
superimposing the first and second intermediate pupils to create the exit pupil.

32. A system for projecting an image, comprising:
means for projecting a first array of image pixels having a first pupil associated therewith;
means for projecting a second array of image pixels having a second pupil associated therewith; and
means for superimposing the first and second pupils to create an exit pupil.

33. The system of claim 32, further comprising:
means for projecting an exit image associated with the exit pupil onto a surface such that there is constant angular separation between pixels of the exit image.

34. The system of claim 33, wherein the surface is a non-planar surface.

35. The system of claim 34, wherein the surface is a hemispherical surface.

36. The system of claim 32, further comprising:
means for directing the first and second arrays of image pixels into respective adjacent regions of an image plane.

37. The system of claim 32, further comprising:
means for generating first and second intermediate images in the respective adjacent regions of the image plane responsive to the first and second arrays of image pixels, the first and second intermediate images having first and second intermediate pupils associated therewith; and
wherein the means for superimposing the first and second pupils comprises:
means for superimposing the first and second intermediate pupils to create the exit pupil.

* * * * *